(12) United States Patent
Fisher (10) Patent No.: US 7,518,333 B1
(45) Date of Patent: Apr. 14, 2009

(54) DYNAMIC REEF SURGE GENERATION

(76) Inventor: Gary Randolph Fisher, 2240 Federal Ave., Los Angeles, CA (US) 90064

( * ) Notice: Subject to any disclaimer, the term of this patent is extended or adjusted under 35 U.S.C. 154(b) by 420 days.

(21) Appl. No.: 11/369,622

(22) Filed: Mar. 7, 2006

Related U.S. Application Data (60) Provisional application No. 60/659,341, filed on Mar. 7, 2005.

(51) Int. Cl.
*H02P 27/00* (2006.01)
(52) U.S. Cl. ...................... 318/723; 318/722
(58) Field of Classification Search ............... None
See application file for complete search history.

(56) References Cited

U.S. PATENT DOCUMENTS

| | | | |
|---|---|---|---|
| 5,883,489 A * | 3/1999 | Konrad ................... 318/807 |
| 6,132,177 A * | 10/2000 | Loprete et al. ............. 417/221 |
| 6,175,210 B1 * | 1/2001 | Schwartz et al. ............ 318/801 |
| 6,350,105 B1 * | 2/2002 | Kobayashi et al. .......... 417/44.1 |
| 6,717,383 B1 * | 4/2004 | Brunt et al. ................. 318/723 |

* cited by examiner

*Primary Examiner*—Walter Benson
*Assistant Examiner*—Renata McCloud (57) ABSTRACT

Two apparatuses are disclosed for providing a dynamically varying water surge in a salt-water reef aquarium. The first apparatus is a micro-controller based variable frequency reef surge drive 100 for an AC permanent magnet synchronous motor (PMSM) submersible aquarium pump. Drive 100 comprises voltage conversion circuitry 105, xmicro-controller 110, reef-surge generation program 115, variable frequency drive 118, mode switch 130 and tidal cycle switch 135. Three user-selectable modes of operation are provided: a random frequency mode, a fixed-program mode and a tidal mode. A second apparatus comprises a novel submersible AC PMSM pump with dual impeller assemblies and dual input and output chambers for supporting forward and reverse flow through an AC PMSM pump.

5 Claims, 8 Drawing Sheets

PRIOR ART

DYNAMIC REEF SURGE GENERATION

CROSS-REFERENCE TO RELATED APPLICATIONS

This application claims priority of provisional application 60/659,341, which was filed on Mar. 7, 2005.

BACKGROUND OF THE INVENTION

This invention relates generally to aquaria and particularly to a cost effective apparatus for generating a time-varying surge in a saltwater reef aquarium.

Reef aquaria contain organisms that evolved in a tidal environment where tidal processes presented an ever-changing flow of nutrients and removal of waste products. In the restricted aquarium environment a lack of appropriately varying circulation can cause waste product buildup (especially in living coral) and reduce the amount of nutrients available to other organisms such as anemones. Waste buildup can cause coral death and susceptibility of other animals in the tank to disease.

Thus methods and apparatuses for causing a dynamically changing circulatory pattern in the salt-water reef aquarium is of practical importance and essential to the well being of the animals in the tank.

To sense the difficulty of the problem one has only to view a toy snow globe with a battery-operated circulator. These globes generally appear on the market every year around Christmas. If one turns on the circulator and initially shakes the globe to insure uniform initial "snow" particle distribution, it only takes a short time for all the "snow" particles to be deposited on the scenic elements of the globe in stationary fashion. The globe has reached steady state with respect to the snow particles even though the circulator continues to move the water within the globe. Think of these "snow" particles as food and/or waste particles in a reef tank.

The general problem of causing a changing flow environment in a reef tank so as to roughly simulate a tidal ocean environment is referred to herein as generating a "reef surge".

There are a number of methods that have been used in the past to generate a reef surge in an aquarium. The majority of these employ mechanical devices that couple with the output fitting of a pump and vary the direction of flow over time in a cyclic manner. Aquaria using these devices quickly reach steady state.

One particularly clever, if decoratively and operationally challenging prior-art solution, is an adaptation of the British elevated water closet: water is pumped up to a reservoir above the aquarium and dumped at regular intervals back into the aquarium. Such an approach causes a cyclic momentary pounding turbulence in the tank that can dislodge tank animals and damage coral.

Electronic prior-art solutions revolve around solid-state relays for turning one or more submersible pumps on and off at pre-determined intervals. These approaches represent a step in the right direction but have limited effectiveness, as they yield no output flow variability.

An electronic solution wherein the flow rate of a submersible pump is varied over time would offer an immediate improvement over the above approaches.

Submersible pumps used in aquariums are almost exclusively AC permanent magnet synchronous motor (PMSM) pumps. These pumps are available with maximum flow rates from approximately 25 gallons-per-hour (gph) to approximately 10,000 gph. Low voltage (i.e. 12VAC) implementations of these pumps, because of market demand, are currently only available for maximum flow rates under 200 gph. In the United States the majority of PMSM submersible pumps run on 110 VAC. Regardless of their design voltage, the speed of such pumps (which is related to the no-load zero-head flow rate) can only be varied by methods that vary the frequency of the waveform supplied to the pump.

U.S. Pat. No. 6,717,383 (co-invented by the present inventor) teaches a cost effective variable frequency drive for controlling PMSM submersible pumps of the type in widespread use in small fountain applications. The generated AC waveform is essentially a variable-width square wave pulse separated by a variable width-dead time. Pending utility application entitled "Variable Frequency, Drive for AC Synchronous Motors with Application to Pumps" by the present inventor provides novel, cost effective embodiments which reduce pump vibration in larger AC PMSM pumps; these have decided utility in the larger tank home aquarium arena.

Application of either of these above referenced electronic technologies in the previous paragraph to the problem of generating a reef surge would constitute a considerable improvement over the prior art. For instance, a single pump could be made to follow a complex sequence of flows with varying inter-flow ramping. Randomness could be introduced in both the sequence of flow rates and the time intervals between successive flow rates. Or, the variation of flow could be made to simulate a time-of-day dependent real-world tidal pattern. Further by adding multiple synchronously or asynchronously controlled pumps strategically located within the tank, a distributed surge could be realized. To the inventor's knowledge no such reef control surge variation protocols have been reported not alone implemented. One aim of this invention is to implement such control schemes in a reef surge apparatus that provides improved dynamically changing circulation in a reef aquarium.

A further considerable improvement would involve generating a dynamically changing forward and reverse flow of water from a single pump dedicated to creating reef surge in a salt-water reef tank. This is another aim of this invention.

BRIEF SUMMARY OF THE INVENTION

It is a primary objective of this invention to provide pump and control apparatus to provide a dynamically changing variable forward and reverse flow of water in a salt water reef aquarium to facilitate making nutrients available to the reef animals and to aid in removing waste products that can lodge in living coral in the tank.

It is another objective of this invention to provide a software program coupled to a micro-controller-based variable frequency pump drive for varying the output of a submersible AC PMSM pump in a complex manner so as to provide dynamically varying circulatory patterns in a reef aquarium.

It is another objective of this invention to provide user selectable modes of operation comprising a random mode, a fixed-program mode and a tidal mode.

It is another objective of this invention to provide a rotor/impeller structure for a single PMSM pump that supports forward and reverse flow through the pump as a function of the direction of rotation of the pump rotor and impeller assembly.

These and other objects of the invention are met by the following apparatuses:

An apparatus for generating a dynamically changing water surge in an aquarium, comprising an AC permanent magnet synchronous motor (PMSM) pump for generating a water surge in said aquarium; a variable frequency drive for generating an AC driving waveform for powering said PMSM pump; a micro-controller for controlling said variable frequency drive and for interfacing with external inputs; and a software program embedded in said micro-controller for producing a dynamically changing circulatory water surge in said aquarium.

An apparatus comprising a permanent magnet synchronous motor (PMSM) pump for creating a dynamic forward and backward surge in a reef tank comprising a concentric rotor and impeller assembly further comprising a first conical impeller having a multiplicity of vanes, a first shaft for coupling said first conical impeller to a magnetic rotor, a second shaft for coupling said magnetic rotor to a second conical impeller having a second multiplicity of vanes wherein the apexes of each conical member are in line, and wherein said first conical impeller is disposed above said second conical impeller, for facilitating the bi-direction movement of water, a PMSM motor with means defining a cylindrical opening to concentrically accept said magnetic rotor wherein said first conical impeller is disposed above said means and where said second conical impeller is concentrically disposed below said means to provide rotational energy to said rotor and impeller means, means defining a first conical pathway for water to flow in an outward direction driven by said first conical impeller, means defining an input chamber for allowing water to enter said first conical pathway, means defining a second conical pathway for water to flow in an inward direction driven by said second conical impeller, means defining an input chamber for allowing water to exit said second conical pathway; and means successively actuating said PMSM motor for causing water to either exit said first conical pathway or enter said second conical pathway.

DETAILED DESCRIPTION

Figure 1:
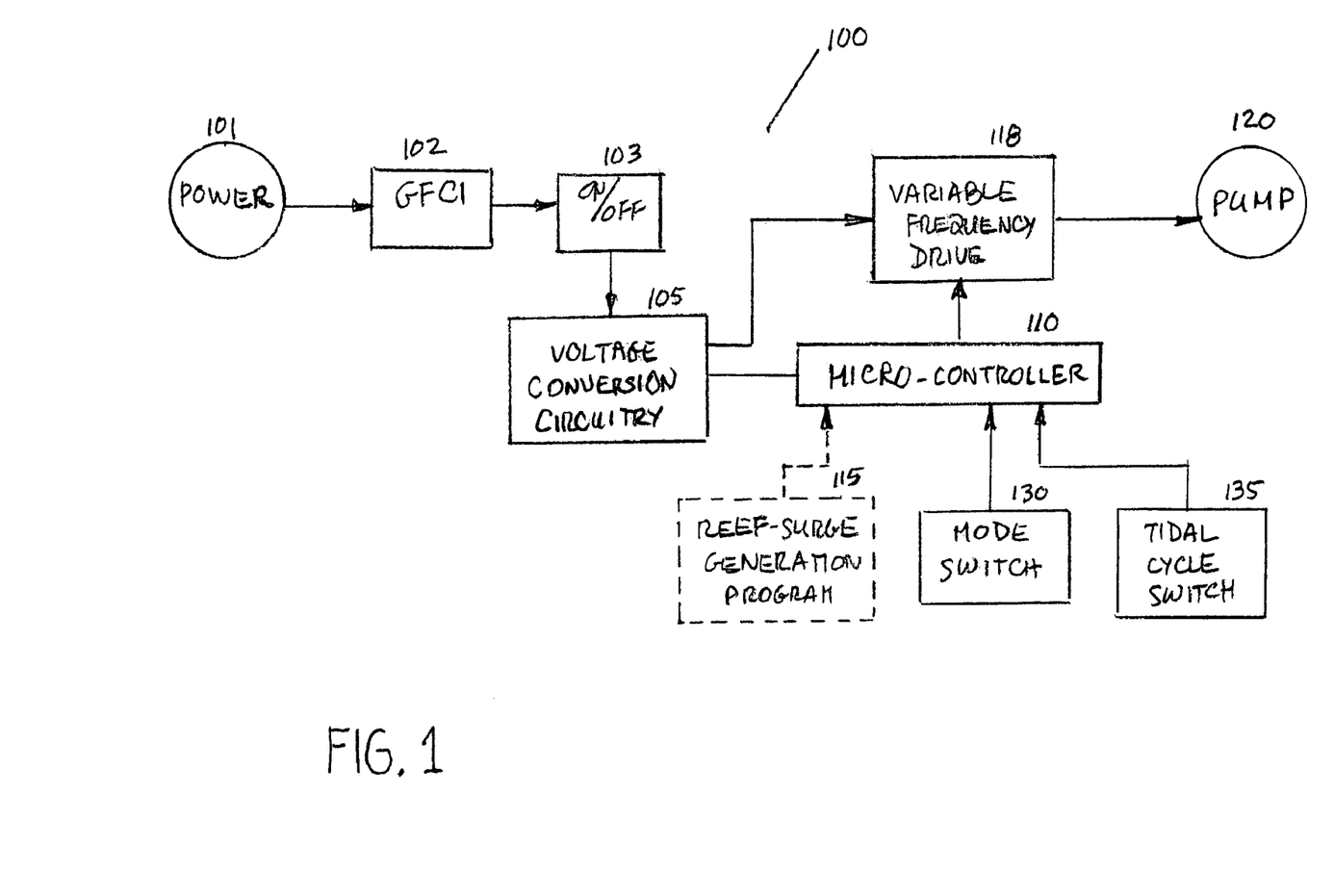
FIG. 1 is a block of a micro-controller based variable frequency reef surge drive for an AC permanent magnet synchronous motor (PMSM) submersible aquarium pump.

FIG. 1 shows block diagram of a micro-controller based variable frequency reef surge drive 100 for an AC permanent magnet synchronous motor (PMSM) submersible aquarium pump. Power source 101 supplies 110 VAC input power to drive 110 and 118. Ground fault circuit interrupter (GFCI) 102 is required in the U.S. for water pumps and aquarium equipment and is especially called for in a salt-water aquarium installation. In the case of low voltage (i.e. 12 VAC) PMSM pumps, power source 101 is preferably a small step-down wall transformer. In this instance GFCI 102 is not necessarily required but would be prudent to be employed.

Voltage conversion circuitry 105 generally provides DC bus driving voltage(s) to 118 and 5 VDC to power micro-controller 110. Circuitry in 105 generally comprises a full wave rectifier and filter for the main bus voltage and voltage reduction circuitry or step-down transformer, rectifier, filter and voltage regulator to provide regulated 5 VDC to power the micro-controller.

The variable frequency drive component in 118 generally comprises an inverter bridge which generates pre-determined waveforms at the desired frequencies to power pump 120. U.S. Pat. No. 6,717,383 teaches a cost effective variable frequency drive for effectively controlling small AC PMSM submersible pumps of the type that can be used in small home aquaria. The AC waveform so generated is essentially a variable-width square wave pulse separated by a variable width-dead time. Pending utility application entitled "Variable Frequency Drive for AC Synchronous Motors with Application to Pumps" by the present inventor provides cost effective embodiments which reduce pump vibration in larger AC PMSM pumps and which have decided utility in the larger tank home aquarium arena.

Figure 8:
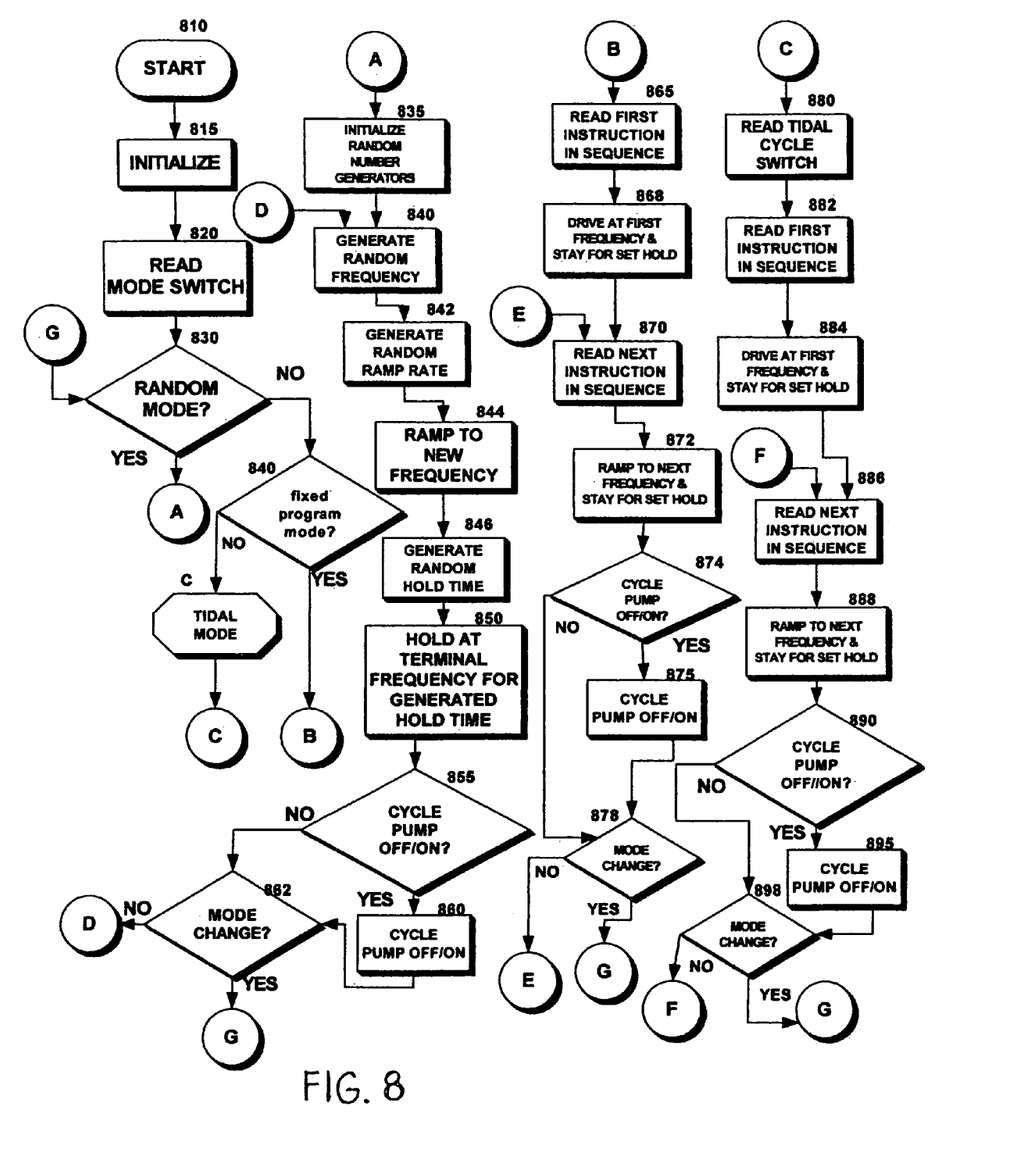
FIG. 8 is a flow chart of an embedded micro-controller based software program for producing dynamically varying circulation in a salt-water reef aquarium.

Reef surge generation program 115 controls the time varying output of PMSM pump 120. Block 115 is shown as dotted in FIG. 1 to indicate that it is embedded in micro-controller 110. A flow chart of this program is shown in FIG. 8 and will be discussed later in this disclosure. Mode switch 130 allows the user to select a given reef control mode from three options: random mode, fixed-program mode or tidal mode. These modes will be discussed later in this disclosure in relation to FIG. 8. Tidal cycle switch 135 allows the user to choose a compressed time frame for tidal flow variation. This switch shall also be described later in this disclosure in relation to FIG. 8.

A discussion of certain properties of AC PMSM submersible pumps is in order at this point in the disclosure. The speed of an AC PMSM is directly proportional to the driving frequency and inversely proportional to the number of poles of the motor. PMSM pumps, as used in the aquarium and fountain industry, generally have two symmetric pole windings. PMSM pumps driven directly from the line either run at frequency-dependent synchronous speeds, stall or fail to start.

The rotors of typical PMSM submersible pumps have no rotationally directional preference. That is, when started from line voltage, these pumps can rotate in either the clockwise or the counter-clockwise direction. For this reason typical AC PMSM submersible pumps are designed with their impellers and impeller chambers configured to give uni-directional flow irrespective of the direction of rotation of the rotor. This is a significant point.

Figure 2:
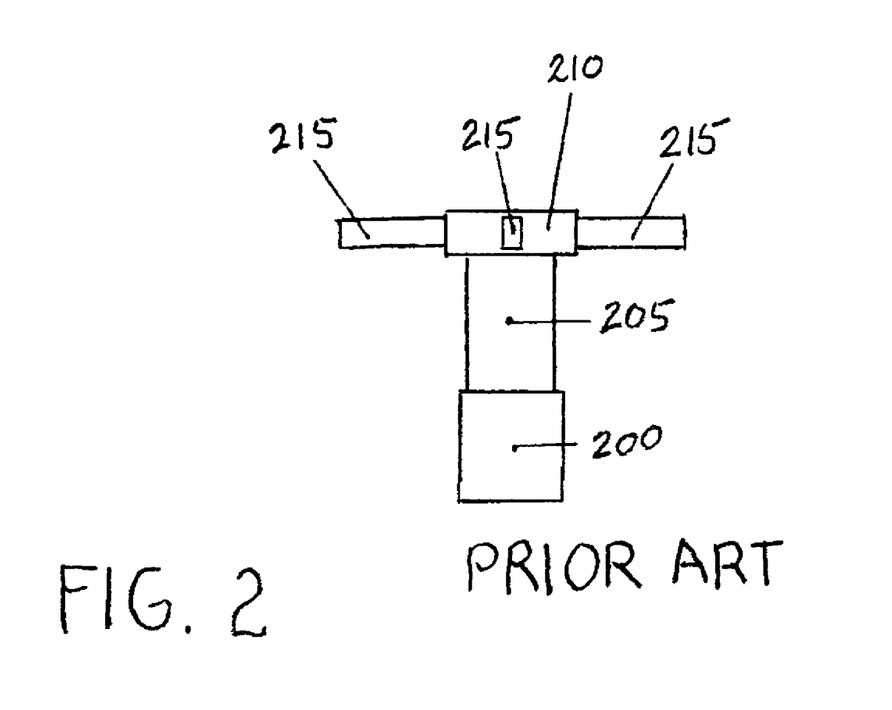
FIG. 2 is a side view of a prior art PMSM pump rotor and impeller assembly.
Figure 3:
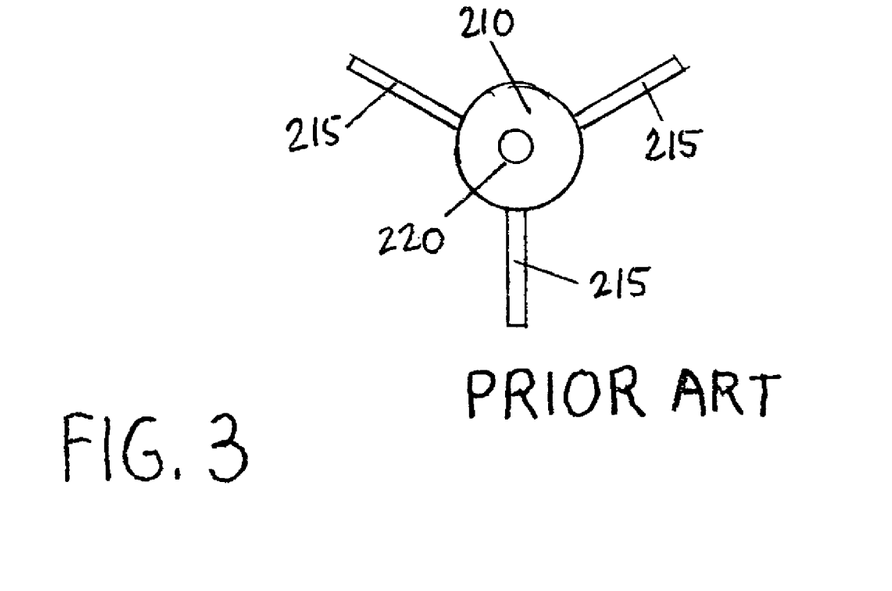
FIG. 3 is a top view of the prior art PMSM pump rotor and impeller assembly shown in FIG. 2.

In submersible PMSM pumps the rotor and impeller assembly form a unitary axially aligned structure. FIG. 2 and FIG. 3 show a side view and top view, respectively, of a typical rotor/impeller assembly. The rotor and impeller assembly comprises permanent magnet rotor 200, shaft 205, impeller body 210, axle opening 220 and impeller vanes 215. Axle opening 220 extends the entire length of the rotor/impeller assembly. Although three vanes 215 are shown in the figures, the number of vanes in some pumps is higher depending on pump design. Each vane, 215, comprises a substantially thin, flat blade with the blade oriented perpendicular to the axle opening. In the majority of rotor and impeller assemblies, the rotor is attached to the shaft in such a way as to allow the rotor to rotate for a portion of one revolution before rigidly coupling to the shaft. This is generally to allow the rotor to begin rotation without having to overcome the hydraulic friction of the impeller in water.

A typical AC PMSM submersible pump body comprises two or more symmetric pole windings which surround a cylindrical rotor opening having an axle mounted concentrically to the opening for receiving the rotor and impeller assembly. The electrical part of the pump body is encapsulated in a resin compound which isolates the windings and AC electrical leads from the water environment in which the pump is to operate.

The pump body has means defining a water inlet chamber and a water outlet chamber. The inlet and outlet chambers are so designed that water will flow outward from the outlet chamber irrespective of the direction of rotation of the rotor. In the majority of such pumps, a removable top structure, which generally closes the outlet chamber, is designed to allow removal of the rotor and impeller assembly for cleaning. For the larger flow-rate pumps this structure generally includes upper bushing means to concentrically receive the upper end of the axle and prevent its vibration. Bushings are generally made of rubber and axles in the latest generation of pumps are generally ceramic.

Typical AC PMSM submersible pumps contain a small diameter rigid output tube for coupling to tubing or various fixtures. The blade-like impeller depicted in FIG. 2 and FIG. 3 when coupled to a PMSM pump body as described in the preceding paragraph, will result in uni-directional flow through the outlet irrespective of the direction of rotation of the rotor.

The SEIO™ super flow pump U.S. Pat. No. 6,746,219 manufactured by More Production® departs from the typical AC PMSM submersible pump that typically yields a narrow stream output by generating a broad quasi-laminar flow output. Uses of this pump are to provide circulation in reef aquariums, heavily populated feeder tanks, ponds and plant aquariums. The energy efficient SEIO™ pump comes in models with capacities from 620 gph to 2600 gph. For example their M820 pump has an output of 800 gph and requires only 18 watts to operate.

Figure 4:
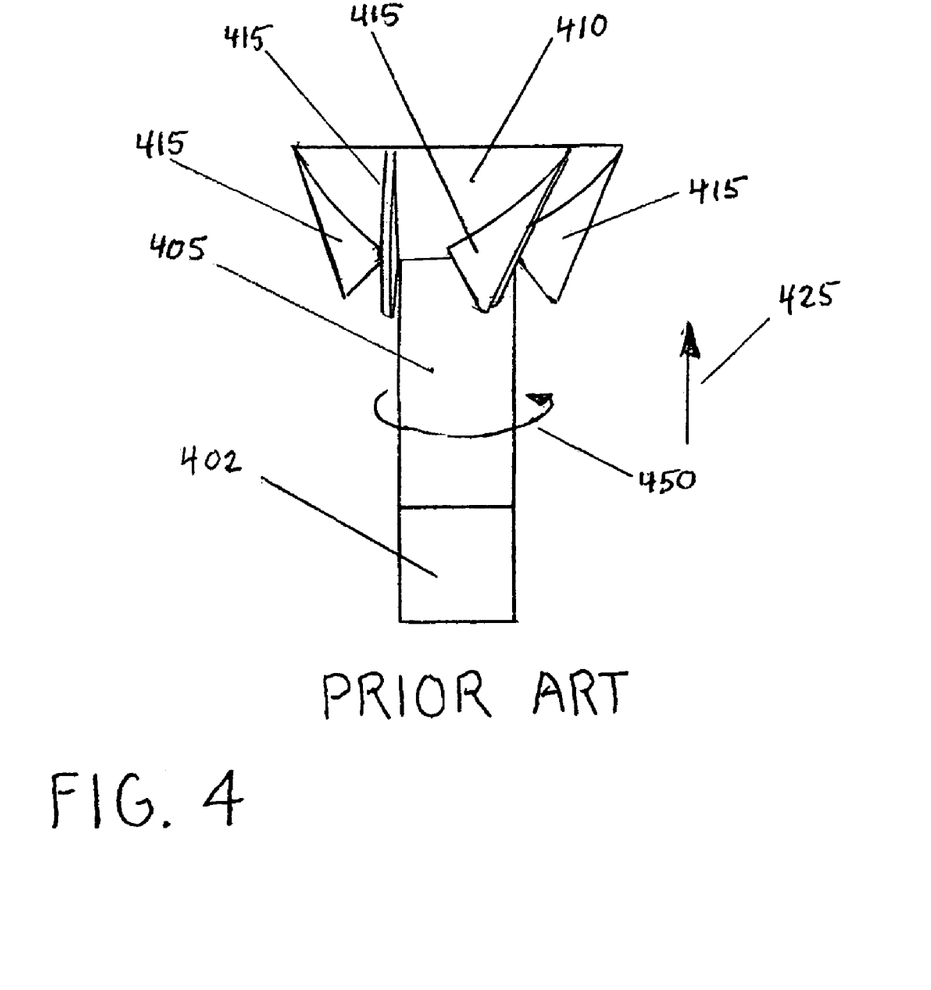
FIG. 4 is a side elevation view of a prior art PMSM pump rotor and impeller assembly designed for uni-directional flow.

Part of the SEIO's novelty is in the manner in which the rotor and impeller assembly is designed. A side view of such a rotor and impeller assembly is shown in FIG. 4 and comprises permanent magnet rotor 402, shaft 405, conical impeller 410 with eight equally spaced curved vanes (415) oriented at an angle with respect to the axis of 410. While not shown in FIG. 4, the water flow path in the pump body is importantly constrained by a conically-shaped channel proximal to impeller 410. As with virtually all prior art PMSM pump impellers, impeller assembly 410 further contains internal means to allow free rotation of magnetic rotor 402 for a portion of a revolution before shaft 405 engages.

The impeller shown in FIG. 4 gives the most efficient and greatest flow in direction 425 (towards the pump outlet) if the rotor rotates in counter-clockwise direction 450. This is a consequence of the shape and orientation angle of the vanes shown in FIG. 4. (Clearly the vanes could be alternatively oriented to give greatest flow if the rotor were to rotate in a clockwise direction). From the discussion on AC PMSM pumps presented previously, if the pole fields in the SEIO™ pump were symmetric, as in typical AC PMSM pumps, the SEIO™ pump when powered directly from the line would not necessarily provide optimal flow each time the pump were started. This would reduce the effectiveness of the impeller design of the SEIO™ pump. To obviate this difficulty the pole fields of the SEIO™ pump for use with a rotor similar to FIG. 4 are asymmetrically weighed to favor rotation in the counter-clockwise direction. One unintended consequence of this solution is that the SEIO pump is difficult to start. Advantageously, a drive protocol disclosed in relation to FIG. 8 ameliorates this problem with the SEIO pump.

It is one of the primary objectives of this invention to provide a dynamically varying reef surge by generating a forwards and reverse variable flow of water in a single AC PMSM pump. In this regard it is advantageous for the pump rotor to have no directional preference but to have an impeller structure that supports efficient forward and reverse flow.

Figure 5A:
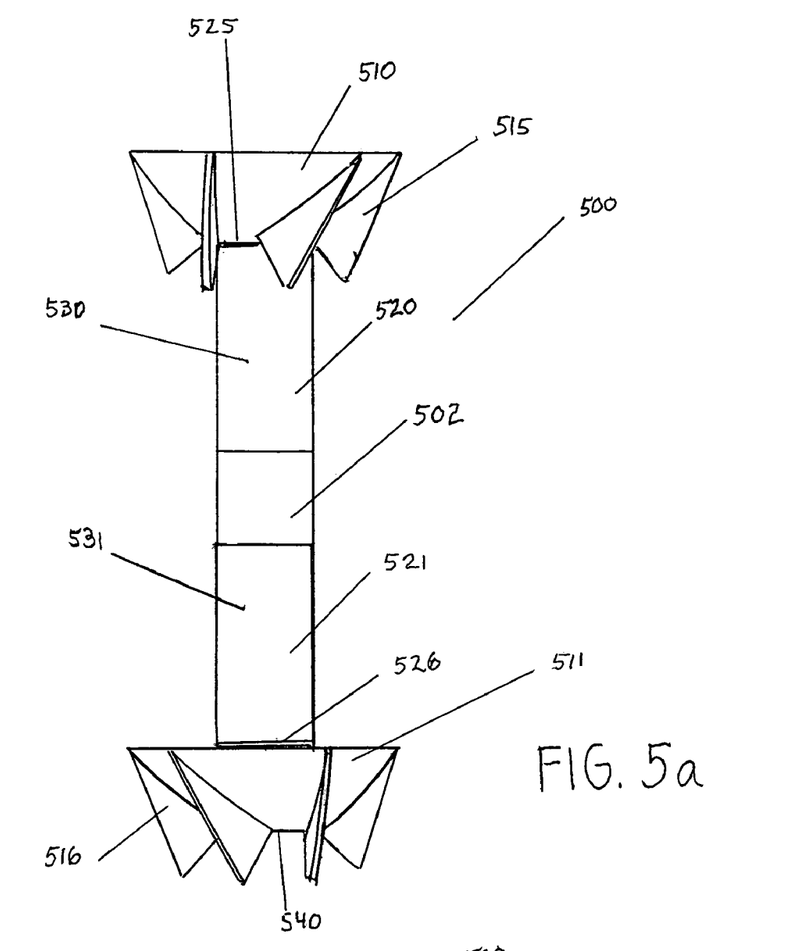
FIG. 5*a* is a side view of a bi-directional rotor and impeller assembly for use with a PMSM pump according to this invention.

FIG. 5a shows an embodiment of a rotor and impeller assembly 500 designed for bi-directional flow. This represents a substantial modification if applied to the SEIO pump as disclosed in U.S. Pat. No. 6,7746,219 by allowing efficient flow to take place in either of two directions in a single pump. In this schema a powerful outflow of water can be on average followed by a powerful influx of water thus efficiently and inexpensively simulating tidal phenomena in the reef tank.

Figure 5B:
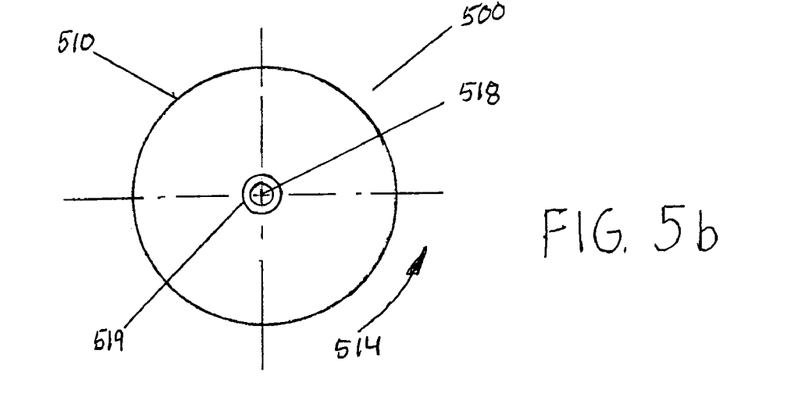
FIG. 5*b* is a top view of the assembly in FIG. 5*a*

In FIG. 5a impeller assembly 500 comprises outflow impeller 510 and inflow impeller 511. Outflow cylindrical shaft 520 and inflow cylindrical shaft 521 are coupled to cylindrical magnetic rotor 502. FIG. 5b gives a top view of impeller assembly 500 viewed toward outflow impeller 510. Opening 518 extends the entire length of 500. Bushing means 519 are provided to receive an axle. Bushing means identical to and concentric with 519 are provided at the base 540 of inflow impeller 511. To make possible insertion and/or removal of 500 from the pump body (to be described shortly in reference to FIG. 7) attachment means 525 and 526 are provided to rigidly and removeably attach impellers 510 and 511 to 500. A preferred method of performing such attachment would be to employ threaded means to couple shafts 520 and 521 to impellers 525 and 526, respectively.

It should be understood in the following discussion that inflow and outflow impellers comprising more or less vanes and/or different physical configuration could alternately be specified—for example to reduce turbulence—without departing from this invention.

By reference to FIG. 5a, the bodies of impellers 510 and 511 are substantially conical and identical. However the vanes 516 of inflow impeller 511 curve in the reverse direction to the vanes 515 of outflow impeller 510. Importantly for intermittent bi-directional flow to occur, only one of the impellers 510 and 511 must rotate for a given direction of rotation of magnetic rotor 502. Therefore, internal means 530 and 531 are provided to rigidly couple only one of shafts 520 and 521 to magnetic rotor 502 for a given direction of rotor rotation.

Figure 6A:
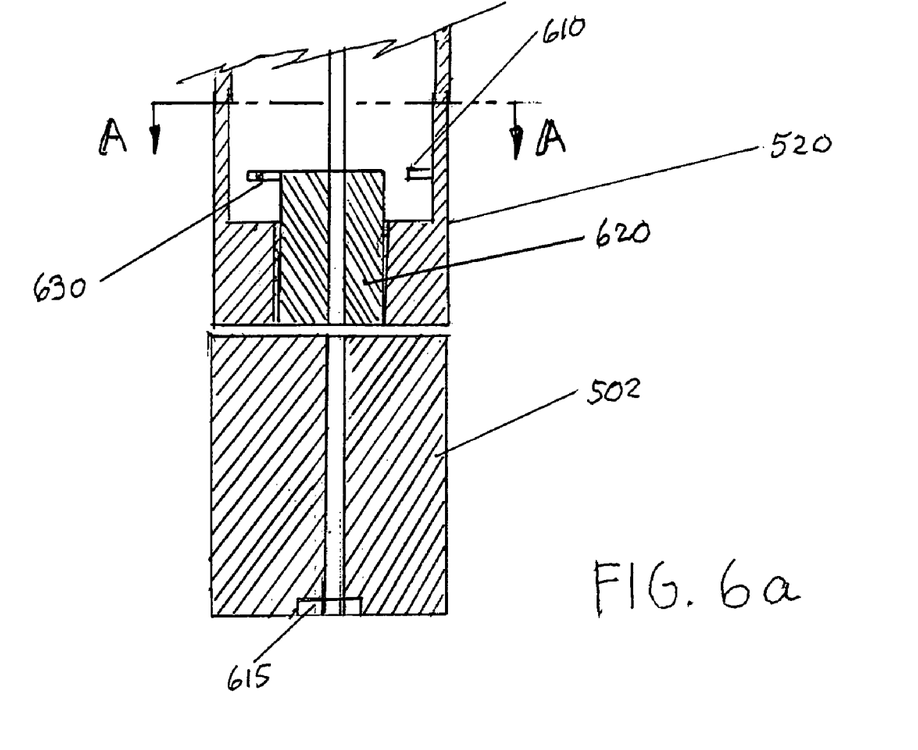
FIG. 6*a* is a side sectional view of the rotor and upper shaft segment assembly allowing only uni-directional impeller rotation.
Figure 6B:
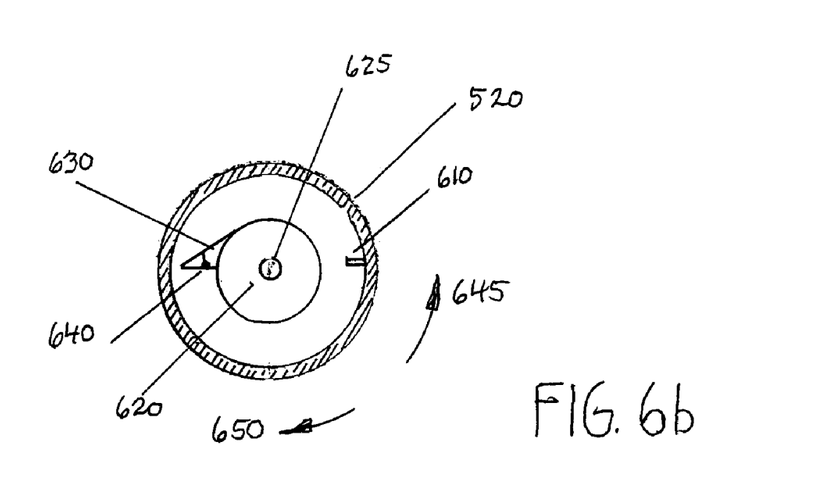
FIG. 6*b* is a top sectional view taken at A-A of the assembly in FIG. 6*a*.

FIG. 6a and FIG. 6b show one embodiment of an internal structure to provide a one-way rotation of impeller 510 when magnetic rotor 502 is rotating counterclockwise and free rotation when 502 is rotating in a clockwise direction.

FIG. 6a shows a side sectional view of the rotor/shaft assembly for uppor shaft segment 520. Magnetic rotor 502 has concentric shaft 620 rigidly attached. The lower section of 520 has concentric opening such that 520 can rotate freely with respect to rotor 502. While not shown in the figure, shaft 620 and the lower segment of 520 have restraining means to prevent vertical movement of 520 relative to 502. Bushing means 615 are provided for an axle.

As shown in FIG. 6b, shaft 620 has unidirectional stop mechanism 630 rigidly attached thereto. Stop 630 is comprised of a substantially triangular member which is split and hinged at 640. The shape of 630 is not critical. When rotor 502 and thereby shaft 620 rotate in counterclockwise direction 645, stop mechanism 630 impacts rotation stop 610 in such a manner as to lock the triangular member. This will force shaft 520 and consequently impeller 510 to rotate in counterclockwise direction 645. If on the other hand, rotor 502 rotates in clockwise direction 650, the apex section of 630 will be displaced, thereby disengaging the rotor from the impeller. For appropriate mass of 630 and starting torque of the associated PMSM motor, centripetal force should suffice to bring 630 into its initial triangular condition during CCW rotation. If this is not sufficient, spring means associated with 630 could be specified without deviating from this invention.

While not shown, a similar mechanism to 630 is provided for shaft 521 which is aligned to drive impeller 511 in a clockwise direction when 502 is rotating in a clockwise direction and disengage when 502 is rotating counterclockwise. The mechanism would have the reverse orientation of 630 with respect to shaft 620.

Other mechanisms with purpose similar to that shown in FIG. 6a and FIG. 6b can be envisioned. One such arrangement would comprise a fixed member with a convex opening which would be attached to shaft 620 replacing 630. On the inner wall of 520 in place of stop 610 would be a flexible rubber line terminating in a spherical rubber ball. The line/ball unit would be preferably of nitrile rubber. In operation the convex opening would catch the ball in the preferred rotational direction; in the non-preferred direction the ball would be deflected by the rear of the fixed member, thereby preventing impeller rotation.

Figure 7:
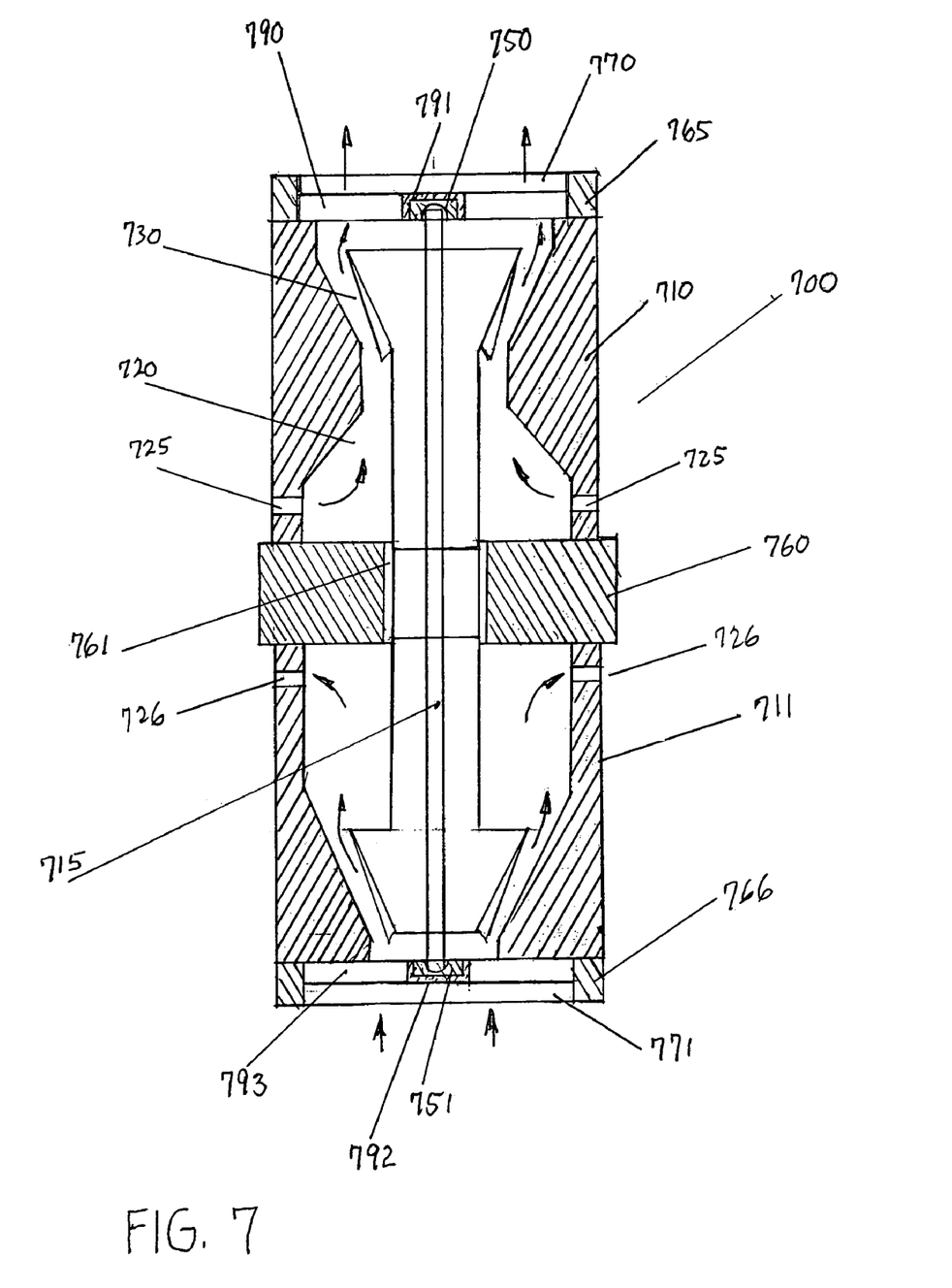
FIG. 7 is a side sectional view of the bi-directional pump of this invention.

FIG. 7 shows a side sectional view of a idealized PMSM pump body 700 and rotor and impeller assembly 500 taken at a plane bisecting the symmetrically disposed pump body and rotor and impeller assembly.

Rotor and impeller assembly 500 rides on axle 715. Axle 715 is concentrically constrained by upper bushing 750 and lower bushing 751 and rotor bushing 615 of FIG. 6a (not shown in FIG. 7). These bushings are typically ceramic.

Motor winding segment 760 of pump body 700 has cylindrical opening 761 to receive rotor/impeller assembly 500 so as to magnetically couple the rotor to the pole windings (windings are not shown).

Upper pump body 710 comprises means defining symmetric conical channel 730 which provides a pathway for water flow around impeller 510. Chamber 720 provides input for water flow through openings 725.

Upper support structure 765 is removably attachable to upper pump body 710 (mounting details not shown). Upper bushing 750 constrains axle 715 and prevents deflection when the rotor and impeller assembly rotates. Bushing support 791 is held to upper pump body by four thin support members, 790, each set at 90-degrees to one another. An output coupling at the terminus of upper support structure 765 may be desired to redirect the direction of flow exiting at 770. Similar to the outflow section of pump 700, the inflow section of pump 700 has lower support structure 766 and is removeably attachable to lower pump body 711. Lower bushing support 792 is held to lower pump body by four thin support members, 793, each set at 90-degrees to one another. An output coupling at the terminus of lower support structure 766 may be desired to redirect the direction of flow entering at 771. Axle 715 is held concentric with opening 761 by bushings 750 and 751.

Assume that the idealized AC PMSM pump in FIG. 7 has symmetric pole windings; therefore, the rotor has no rotational preference when driven directly from the line. Thus the pump, upon successively being turned on/off/on will randomly either pump water out of the pump or will pull water into it.

This bi-directional flow behavior provides the means for realizing a more complex dynamic internal surge in a reef tank environment than would be the case with a pump with uni-directional flow. It is noted that the probability of immediately successive off/on cycles causing flow reversal can be enhanced through implementation of the software program to be described later in this disclosure in conjunction with the apparatus in FIG. 1.

The just described bi-directional behavior of this invention is practically and significantly different from simply bi-directionally forcing water out of one nozzle and then out of other. From an aquarium viewer's perspective, the behavior of animals and fish in a tank fitted with the bi-directional pump and software/hardware implementation of this invention would appear much like that which would be experienced by a scuba diver in an actual reef environment hovering in proximity to a reef. The present invention helps to bring the "outside-in" while providing more efficient circulation than the prior art.

FIG. 8 is a flow chart of a micro-controller based software program for producing dynamically changing flow variations in a salt-water reef aquarium. This program is embedded in micro-controller 110 in FIG. 1.

The program commences in start block 810 when switch 102 in FIG. 1 is turned on. Initialization block 815 initializes the micro-controller and sets the ports to their initial states. Read mode switch block 820 checks the status of mode switch 130. The state of mode switch 130 is queried in decision blocks 830 and 840 to determine which of three user-selectable operational modes is to be run.

The modes are random, fixed-program and tidal. While additional modes can be contemplated, these three yield a range of pump behaviors that should cover most reef tank applications.

From a micro-controller standpoint an elegant implementation of mode switch 130 would comprise a momentary switch and one pin of an available port. Each time the switch is pressed the mode would increment to the next mode and appropriate actions would be taken. Modes could be indicated to the user with LED's. In the case of three modes 4 pins would be required to provide user input and visual feedback.

Each of the three modes of operation shall now be discussed.

Random Mode

In the random mode (loop A in FIG. 8) the pump is cycled through a succession of randomly chosen frequencies, ramp rates and hold times. Note that for AC PMSM pumps, frequency is proportional to no-load speed and zero-head flow rate.

Block 835 initializes the pseudo-random number generator for the frequency, ramp rate and hold time variables. Blocks 840 and 842 then generate a random frequency and ramp rate. In block 844 the pump is driven via variable frequency drive 118 in FIG. 1 to the new frequency at the generated ramp rate. (The first time through 844 the pump is simply run at the generated frequency.) After reaching the new frequency block 850 holds the pump at this frequency for a randomly determined time generated in Block 846.

Cycle pump off/on decision block 855 is then evaluated. For uni-directional pump implementations, decision blocks (855, 860), (874, 875) and (890, 895) are not necessary, as the decision would have no effect on the direction of flow through the pump.

For bi-directional AC PMSM pumps according to this invention, blocks 855, 874 and 890 determine whether the pump should be cycled off/on. The off condition in blocks 860, 875 and 895 is implemented within the software which sets both power leads to pump 120 to zero volts.

For AC PMSM pumps, turning the pump off and then on again does not necessarily insure a change in flow direction, as the flow directional change is probabilistic. If the pump were started directly from the line, then the rotor would randomly begin rotation either in the upward half of the sine wave or in the downward half of the wave. Not considering the initial position of the rotor with respect to the poles when the pump is powered on, it would be equally likely for the rotor to rotate clockwise or counterclockwise. Since in the implementation of the invention being discussed here, pump 120 is not driven directly from the line but is driven by inverter 118 (FIG. 1), it is advantageous that for successive pump-on cycles, the direction of each startup power pulse to the pump is alternated between positive going and negative going. Such a protocol is implemented in blocks 860, 875 and 895. This protocol substantially increases the probability that successive pump-on cycles will result in reversal of pump flow direction.

If it were desired to weight the probability that successive pump-on cycles would favor for example, say, counterclockwise rotor rotation, this could easily be accomplished by having all startup pulses begin in an identical pre-determined pulse direction. Such a protocol would reduce starting problems of the prior art uni-directional SEIO pump described earlier in this disclosure.

In decision block 862 following the change-direction blocks, mode switch 130 is then checked for activation. If a mode change is detected, the next appropriate mode instructions are executed. (The decision in 862 can be programmatically handled with an interrupt, thus precluding the necessity for checking the switch in the program loops). If no program change is detected, the random mode continues with block 840 and 842 where the next random frequency and ramp rate are generated.

The pump is then is made to ramp from the preceding frequency to the next frequency at the next ramp rate just generated. Hold block 850 then keeps the pump running at this new frequency for the new hold time generated in 846.

The sequence (internal loop D) continues until either a new mode is selected by the user or the pump drive is turned off via switch 103 in FIG. 1.

Fixed-Program Mode

The fixed-program mode (loop B in FIG. 8) contains a sequence of pre-programmed instructions that drive the pump over a range of predetermined behaviors. Internal to these behaviors is the sub-loop E sequence in FIG. 8 which comprises ramping between successive pre-selected frequencies at pre-selected ramp rates and holding for pre-selected hold times. Although not shown in FIG. 8 the instruction set implicit in the fixed-program mode contains nested loops and a mix of random and predetermined loop selection branches. These allow internal periodicities to be generated while avoiding a steady state condition to develop in the tank.

A variety of pre-programmed behaviors can be implemented in 870. These include: ramping the pump up and down between a minimum and maximum frequency at a succession of ramp rates; successively reducing the maximum frequency after each up and down cycle and repeating the sequence until the minimum frequency is reached; starting at the minimum frequency and cycling at incremental frequencies up to the maximum frequency; and, jumping between random frequencies. Chaotic randomness can be implemented by repeating loops a randomly determined number of times and by implementing random loop-branching sequence.

Tidal Mode

The tidal mode (loop C in FIG. 8) contains a sequence of pre-programmed instructions that drive the pump over a cycle of increasing and decreasing frequency (flow rate) to simulate time-of-day variations in tidal flow.

In block 880 tidal cycle switch 135 (FIG. 1) is read. The tidal cycle switch allows the user to control the length of a simulated tidal day. Pre-selected internal program multipliers simulate a tidal day in shorter time intervals than real time. For example a low tide/high tide sequence could be simulated in, say, 1 hour, 3 hours or 6 hours of pump time. Programmatically, the switch setting affects the hold times between successive tidal flows and the length and rest between waves within a given tidal flow value.

Consider that $f_{min}$ corresponds to a frequency at which the tidal height is minimum (low tide). In terms of the reef tank, assume that tidal height is analogous to pump flow rate. Thus $f_{min}$ is the frequency corresponding to a tank flow rate that corresponds to low tide. Similarly let $f_{max}$ be the frequency corresponding to a high tide tank flow rate. Based on microcontroller constraints consider that n (a small number $\leq 32$) equal incremental frequencies between $f_{min}$ and $f_{max}$ are chosen to handle the cyclic variation of tidal height (flow) between low tide and high tide. By definition for each of the n+1 frequencies including $f_{min}$ and $f_{max}$ there is an associated simulated time at which the program stays at that frequency, $t_f$, a wave ramp rate, $r_f$, a wave hold time, $h_f$ and an inter-wave hold time $w_f$.

To generate "waves" for each of the frequencies $f_{min} \leq f_i \leq f_{max}$ the pump is ramped from the lowest frequency, $f_0$, that the pump can attain to $f_i$, at a ramp rate $r_f$ for that frequency. This represents a wave. The pump is then held at frequency $f_i$ for time $h_f$. Once $h_f$ expires the pump is then ramped down from $f_i$ to $f_0$. This represents the receding flow between waves. This sequence at each such frequency (with hold times $w_f$ between waves) is repeated a number of times corresponding to the length of simulated time $t_f$ (based on switch 135 setting) that the program should stay at frequency $f_i$.

If the tidal sequence is started at simulated low tide, then the program generates a sequence of waves at each of the increasing n+1 frequencies from simulated low tide to high tide. This sequence is then repeated in descending order to treat the simulated high tide to low tide cycle. This behavior is programmed in the sub-loop F sequence in FIG. 8.

For the bi-directional pump according to this invention, the pump could be turned off/on at the expiration of the hold time $h_f$ of each wave. This would simulate the out rush of water in an ocean environment after a wave.

Figure 9:
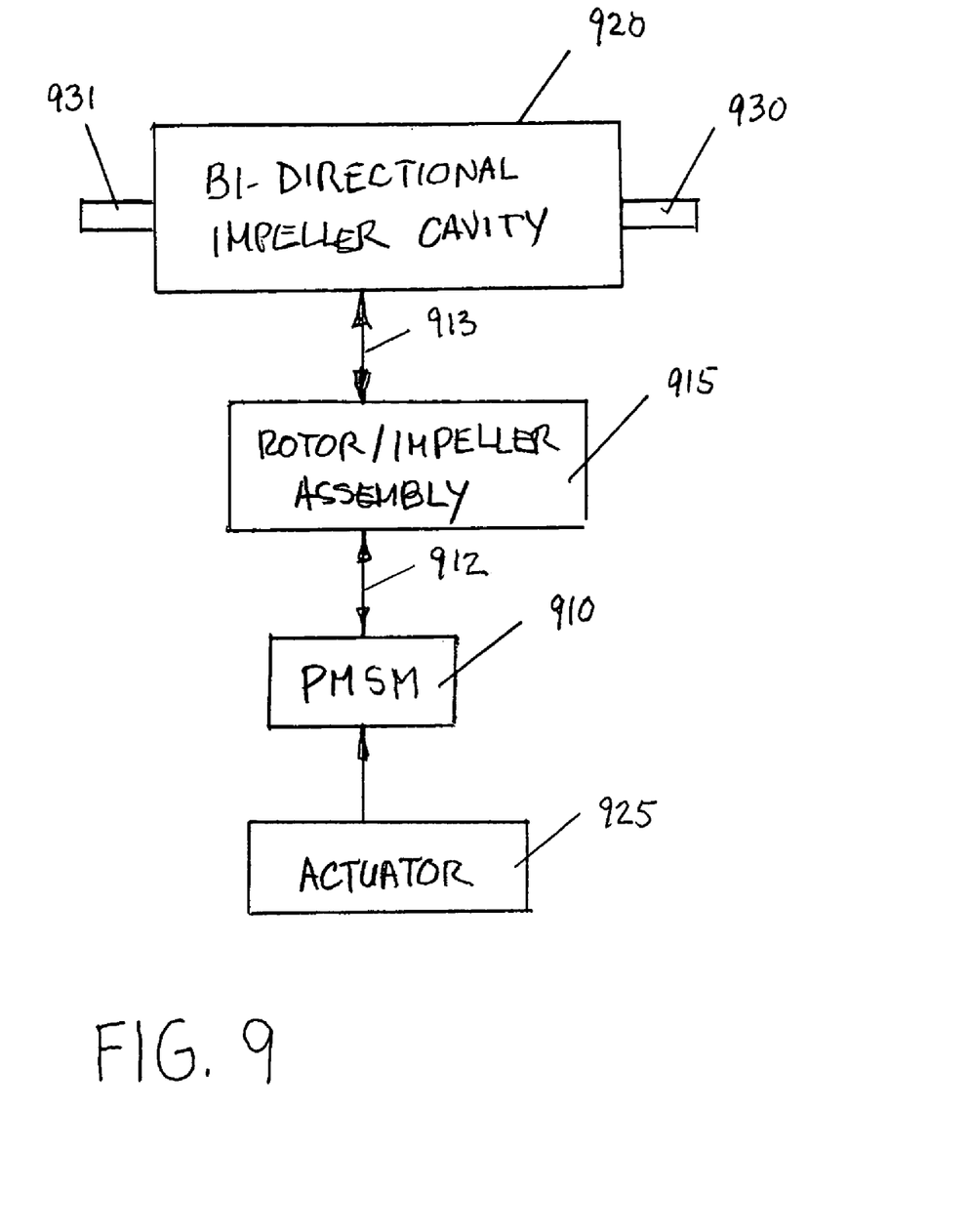
FIG. 9 is a generalized block diagram of a PMSM pump designed for bi-directional operation.

FIG. 9 shows a block diagram 900 of a generalized submersible bi-directional PMSM pump wherein the rotor is integral to the motor and impeller. The two-way arrow 912 is used to indicate this integration. PMSM 910 is powered intermittently by actuator 925. This has the effect of changing the direction of rotor (and thereby impeller) rotation. Actuator 925 can range from a simple synchronous motor driven cam-type electro-mechanical actuator, to the complex control regimes of this invention.

As indicated by two-way arrow 913 impeller/rotor assembly 915 is directly coupled to bi-directional impeller cavity 920 which depending on the direction of rotation of 915 defines ports 930 or 931 as either inlet or outlet. By implication with the earlier points in this disclosure ports 930 and/or 931 can be diffuse rather than of simple cylindrical configuration.

When using a single impeller, (unlike the impeller assembly of the present invention) various approaches to the design of the impeller and impeller cavity 915 can be considered. Solutions can range from employing asymmetrical cavities coupled to a flexible impeller to solutions involving membranes to flip input and output ports depending on the direction of impeller rotation.

FIG. 9 clearly indicates a method for generating a bi-directional surge. This method involves the steps of coupling the impeller/rotor assembly of a PMSM to a bi-directional impeller cavity, generating bi-directional flow from two ports wherein impeller and impeller cavity are specifically designed to support bi-directional flow, and probabilistically reversing the flow direction by successively actuating the pump.

Other embodiments and changes to the invention can be considered.

Firstly, one can consider provision of a potentiometer feeding an AND converter resident in micro-controller 110 in FIG. 1. The purpose of this potentiometer would be to allow the user to set the maximum frequency that the pump is to be driven at. This would allow the user to "fine tune" pump output for his/her particular aquarium environment.

Secondly, while three modes of operation were disclosed, additional modes could be specified. For instance, one such mode is a "cleansing" mode in which the tank would be subjected to extended periods of gently varying flow interspersed with relatively brief periods of vigorous agitation.

Thirdly, more than one pump could be connected to the same controller for use in different regions of the aquarium.

Fourthly, while not necessarily cost effective for the small aquarium, two or more pumps each with its own program could be run synchronously. Or multiple pumps utilizing the same program could be run asynchronously. Suitable circulation would obtain just by choosing different modes of operation for each pump or starting the pumps at different times.

Although there has been shown and described hereinabove specific arrangements of reef surge apparatuses for generating dynamically changing surges in a salt-water reef aquarium in accordance with the invention for the purpose or illustrating the manner in which the invention may be used to advantage, it will be appreciated that the invention is not limited thereto. Accordingly, any and all modifications, variations, or equivalent arrangements, which may occur to those skilled in the art, should be considered to be within the scope of the invention.

I claim:

1. A permanent magnet synchronous motor (PMSM) pump for creating a dynamic forward and backward surge in a reef tank comprising:
   a. a concentric rotor and impeller assembly comprising a first conical impeller having a first multiplicity of vanes, a first shaft for coupling said first conical impeller to a magnetic rotor, a second shaft for coupling said magnetic rotor to a second conical impeller having a second multiplicity of vanes wherein the apexes of each conical member are in line, and wherein said first conical impeller is disposed above said second conical impeller, for facilitating the bi-direction movement of water through said pump;
   b. a permanent magnet synchronous, PMS, motor with means defining a cylindrical opening to concentrically accept said magnetic rotor wherein said first conical impeller is disposed above said cylindrical opening means and where said second conical impeller is concentrically disposed below said cylindrical opening means where said PMS motor provides rotational energy to said rotor, for driving water in either of two directions;
   c. means defining a first conical pathway for water to flow in an outward direction driven by said first conical impeller;
   d. means defining an input chamber for allowing water to enter said first conical pathway;
   e. means defining a second conical pathway for water to flow in an inward direction driven by said second conical impeller;
   f. means defining an input chamber for allowing water to exit said second conical pathway; and
   g. means successively actuating said PMSM pump for causing water to either exit said first conical pathway or enter said second conical pathway.

2. The apparatus in claim 1 wherein said PMSM pump is submersible.

3. The apparatus of claim 1 wherein said first multiplicity of vanes and said second multiplicity of vanes are radially disposed in opposing directions.

4. The apparatus of claim 1 further comprising coupling means wherein one of said conical impellers is driven in a preferred rotational direction when said rotor rotates in the preferred direction for coupling while at the same time the other said conical impeller is made operationally non-rotateable when said rotor is rotating in said preferred direction.

5. The coupling means of claim 4 wherein said coupling means comprise a bisected, hinged member and a radially disposed stop forcing impeller rotation in one direction when said rotor revolves in a preferred direction and decoupling said impeller from said rotor when said rotor rotates in the opposite direction to said preferred rotational direction.

* * * * *